United States Patent
Lv et al.

(10) Patent No.: US 9,172,496 B2
(45) Date of Patent: Oct. 27, 2015

(54) CQI (CHANNEL QUALITY INDICATION) INFORMATION REPORTING METHOD, AND RELATED BASE STATION AND USER EQUIPMENT

(71) Applicant: Huawei Technologies Co., Ltd., Shenzhen (CN)

(72) Inventors: Yongxia Lv, Shenzhen (CN); Yan Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 13/663,990

(22) Filed: Oct. 30, 2012

(65) Prior Publication Data

US 2013/0051349 A1  Feb. 28, 2013

Related U.S. Application Data

(63) Continuation of application No. PCT/CN2011/073509, filed on Apr. 29, 2011.

(30) Foreign Application Priority Data

Apr. 30, 2010  (CN) .......................... 2010 1 0169429

(51) Int. Cl.
*H04W 24/10* (2009.01)
*H04L 1/00* (2006.01)
*H04W 72/04* (2009.01)
*H04L 5/00* (2006.01)

(52) U.S. Cl.
CPC ............ *H04L 1/0027* (2013.01); *H04L 1/0026* (2013.01); *H04L 1/0028* (2013.01); *H04L 5/001* (2013.01); *H04W 24/10* (2013.01); *H04W 72/042* (2013.01)

(58) Field of Classification Search
None
See application file for complete search history.

(56) References Cited

U.S. PATENT DOCUMENTS 8,305,986 B2 * 11/2012 Zhang et al. .................. 370/329
8,331,401 B2 * 12/2012 Yang et al. .................... 370/468
(Continued)

FOREIGN PATENT DOCUMENTS

CN 101132256 A 2/2008
CN 101500274 A 8/2009
(Continued)

OTHER PUBLICATIONS

Partial English Translation of previously cited Chinese publication No. 101547477A.
(Continued)

*Primary Examiner* — Robert C Scheibel
(74) *Attorney, Agent, or Firm* — Brinks Gilson & Lione (57) ABSTRACT

A information reporting method, base station and user equipment is provided in this invention. The method comprises sending the MAC layer carrier activation signaling to the UE, for activating a first CC of the UE, the MAC layer carrier activation signaling comprising CQI instruction information, for instructing the UE to report aperiodic CQI information of a second CC of the UE, so that the UE triggers to report aperiodic CQI information of the second CC of the UE upon receiving the MAC layer carrier activation signaling. With the information reporting method, base station and user equipment provided in an embodiment of this invention, the problem of slower report of CQI information of activated CCs can be addressed.

12 Claims, 7 Drawing Sheets

(56) References Cited

U.S. PATENT DOCUMENTS

| | | | |
|---|---|---|---|
| 8,724,574 B2 * | 5/2014 | Yang et al. | 370/329 |
| 2009/0130986 A1 | 5/2009 | Yun et al. | |
| 2010/0271970 A1 * | 10/2010 | Pan et al. | 370/252 |
| 2011/0141941 A1 * | 6/2011 | Lee et al. | 370/252 |
| 2011/0317652 A1 * | 12/2011 | Kim et al. | 370/329 |
| 2012/0076017 A1 * | 3/2012 | Luo et al. | 370/252 |
| 2012/0269153 A1 * | 10/2012 | Seo et al. | 370/329 |
| 2013/0039202 A1 | 2/2013 | Feuersanger et al. | |
| 2013/0051339 A1 * | 2/2013 | Yang et al. | 370/329 |

FOREIGN PATENT DOCUMENTS

| | | |
|---|---|---|
| CN | 101547477 A | 9/2009 |
| CN | 101682590 A | 3/2010 |
| CN | 102870365 A | 1/2013 |
| WO | 2007/091858 A2 | 8/2007 |

OTHER PUBLICATIONS

Office Action (including partial English translation) issued in corresponding Chinese Patent Application No. 201010169429.5; mailed May 6, 2013.

Written Opinion of the International Searching Authority issued in corresponding PCT Patent Application No. PCT/CN2011/073509, mailed Aug. 4, 2011.

International Search Report issued in corresponding PCT Patent Application No. PCT/CN2011/073509, mailed Aug. 4, 2011.

3GPPTS36.212, V12.1.0 Technical Specification, $3^{rd}$ Generation Partnership Project; Technical Specification Group Radio Access Network; Evolved Universal Terrestrial Radio Access (E-UTRA); Multiplexing and channel coding (Release 12) (Jun. 2014).

3GPPTS36.213, V12.2.0 Technical Specification, $3^{rd}$ Generation Partnership Project; Technical Specification Group Radio Access Network; Evolved Universal Terrestrial Radio Access (E-UTRA); Physical layer procedures (Release 12) (Jun. 2014).

* cited by examiner

CQI (CHANNEL QUALITY INDICATION) INFORMATION REPORTING METHOD, AND RELATED BASE STATION AND USER EQUIPMENT

CROSS REFERENCE

This application is a continuation of International Application No. PCT/CN2011/073509 filed on Apr. 29, 2011, which claims the priority of a Chinese application No. 201010169429.5 filed on Apr. 30, 2010, both of which are hereby incorporated by reference in their entireties.

FIELD OF THE INVENTION

Embodiments of this invention relate to the field of communication technology, and more specifically, to an information reporting method, a base station and user equipment.

BACKGROUND OF THE INVENTION

In the uplink direction of a wireless communication system, a UE (User Equipment) needs to feed back CQI (Channel Quality Indication) information to a BS (Base Station). With CQI information fed back by the UE, the BS may be aware of downlink channel quality status perceived by the UE, facilitating frequency selection scheduling preformed by the BS.

CQI information of the UE is reported to the BS through PUCCH (Physical Uplink Control Channel) or PUSCH (Physical Uplink Shared Channel).

In carrier aggregation technology, two or more CCs (Component Carrier) have their frequency spectrums aggregated to get a communication system with broader transmission bandwidth, in which each CC can be configured as system compliable, and the spectrums of various CCs may be adjacent continuous frequency spectrums, or discontinuous spectrums in a same band, or even discontinuous spectrums in different bands.

The manner for reporting the CQI information of the UE may include an aperiodic CC reporting manner and a periodic CC reporting manner; CQI information of a CC reported in the aperiodic reporting manner is referred to as aperiodic CQI information, and CQI information of CC reported in the periodic reporting manner is referred to as periodic CQI information.

In the prior art, the aperiodic CQI information reporting method has to trigger reporting of CQI information for one or more CCs after activating the one or more CCs, and the CQI information of the one or more CCs only can be reported after 12 subframes.

The prior art has the following problem: for activated CCs, their CQI information is reported at a lower speed.

SUMMARY OF THE INVENTION

Embodiments of this invention provide an information reporting method, a BS and a UE to address the problem in the prior art that, for activated CCs, their CQI information is reported at a lower speed.

An information reporting method is provided in an embodiment of this invention, comprising:
sending to a UE a MAC (Medium Access Control) layer carrier activation signaling for activating a first CC of the UE, the MAC layer carrier activation signaling comprising CQI instruction information, for instructing the UE to report aperiodic CQI information of a second CC of the UE, the second CC comprising at least one of the first CC and CCs that have been activated before receiving the MAC layer carrier activation signaling by the UE, so that the UE triggers to report aperiodic CQI information of the second CC of the UE upon receiving the MAC layer carrier activation signaling.

An information reporting method is provided in an embodiment of this invention, comprising:
receiving by a UE a MAC (Medium Access Control) layer carrier activation signaling for activating a first CC of the UE sent from a BS, the MAC layer carrier activation signaling comprising CQI instruction in formation, for instructing the UE to report aperiodic CQI information of a second CC of the UE, the second CC comprising at least one of the first CC and CCs that have been activated before receiving the MAC layer carrier activation signaling by the UE;
triggering to report aperiodic CQI information of the second CC of the UE upon receiving the MAC layer carrier activation signaling by the UE.

An information reporting method is provided in an embodiment of this invention, comprising:
sending to a UE a MAC layer carrier activation signaling for activating a first CC of the UE to trigger the UE to report aperiodic CQI information of the first CC, or to report aperiodic CQI information of all activated CCs.

An information reporting method is provided in an embodiment of this invention, comprising:
receiving by a UE a MAC layer carrier activation signaling for activating a first CC of the UE sent from a BS;
triggering by the UE to report aperiodic CQI information of the first CC or aperiodic CQI information reporting of all activated CCs.

A base station (BS) is provided in an embodiment of this invention, comprising:
a generation module for generating a MAC layer carrier activation signaling for activating a first CC of a UE, the MAC layer carrier activation signaling comprising CQI instruction information, for instructing the UE to report aperiodic CQI information of a second CC of the UE, the second CC comprising at least one of the first CC and CCs that have been activated before receiving the MAC layer carrier activation signaling by the UE, so that the UE triggers to report aperiodic CQI information of the second CC of the UE upon receiving the MAC layer carrier activation signaling;
a sending module for sending the MAC layer carrier activation signaling generated by the generation module to the UE.

A user equipment (UE) provided in an embodiment of this invention, comprising:
a receiving module for receiving a MAC layer carrier activation signaling for activating a first CC of the UE sent from a BS, the MAC layer carrier activation signaling comprising CQI instruction in formation, for instructing the UE to report aperiodic CQI information of a second CC of the UE, the second CC comprising at least one of the first CC and CCs that have been activated before receiving the MAC layer carrier activation signaling by the UE;
a report triggering module for triggering to report aperiodic CQI information of the second CC of the UE upon receiving the MAC layer carrier activation signaling by the receiving module.

A base station (BS) is provided in an embodiment of this invention, comprising:
a second generation module for generating a MAC layer carrier activation signaling for activating a first CC of a UE, the MAC layer carrier activation signaling being used for triggering the UE to report aperiodic CQI information of the first CC, or to report aperiodic CQI information of all activated CCs;

a second sending module for sending the MAC layer carrier activation signaling generated by the second generation module to the UE.

A user equipment (UE) is provided in an embodiment of this invention, comprising:

a second receiving module for receiving a MAC layer carrier activation signaling sent from a BS for activating a first CC of the UE, a second triggering module for triggering to report aperiodic CQI information of the first CC, or aperiodic CQI information reporting of all activated CCs upon receiving the MAC layer carrier activation signaling by the second receiving module.

With the information reporting method, BS and UE provided in embodiments of this invention, a BS is enabled to rapidly acquire CQI information of activated CCs of a UE, effectively improving downlink data channel performance of component carriers of the UE.

BRIEF DESCRIPTION OF THE DRAWINGS

For a more explicit description of the technical solutions of embodiments of this invention or the prior art, a brief introduction of accompanying drawings to be used in the description of these embodiments or the prior art will be given below. Obviously, accompanying drawings described below are merely some embodiments of this invention, for those skilled in the art, other accompanying drawings can be derived from these ones without any creative efforts.

DETAILED DESCRIPTION OF THE EMBODIMENTS

For making the objects, technical solutions and advantages of embodiments of this invention more apparent, a clear, complete description will be given to technical solutions of embodiments of this invention in connection with accompanying drawings of embodiments of this invention. Obviously, embodiments described herein are merely some of the embodiments of this invention, but not all of them. Based on those embodiments of this invention, other embodiments can occur to those skilled in the art without any creative efforts, all of which fall within the scope of this invention.

Figure 1:
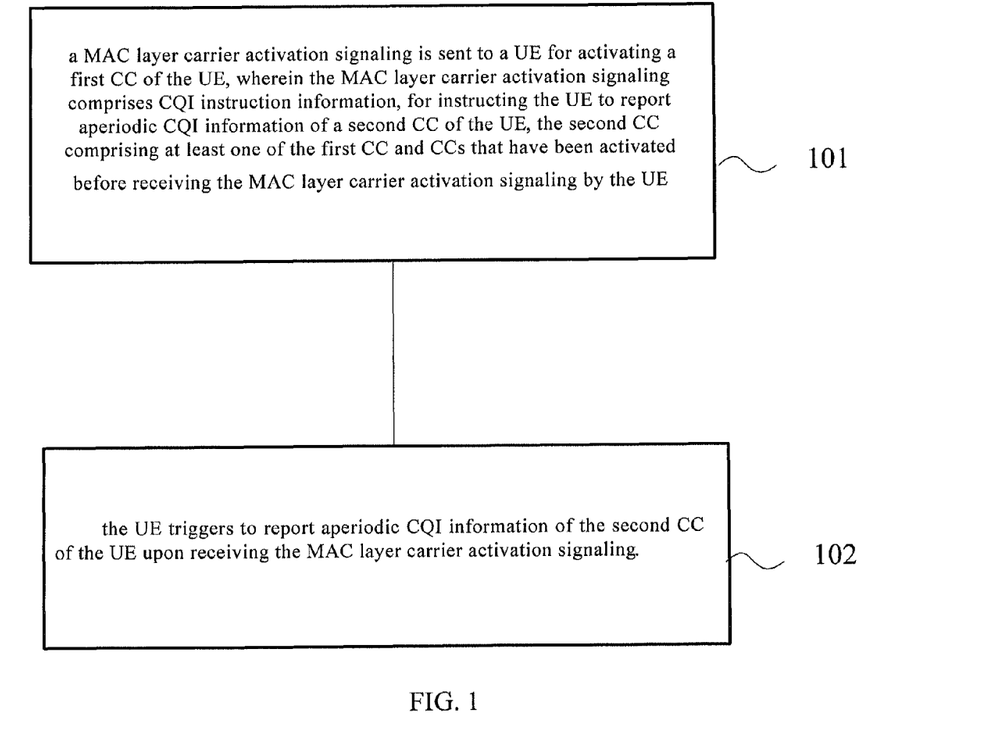
FIG. 1 is a flowchart of an information reporting method provided in an embodiment of this invention.

An information reporting method provided in an embodiment of this invention will be particularly described in connection with FIG. 1 below. As shown in FIG. 1, the method comprises the following steps.

At step 101, a MAC (Medium Access Control) layer carrier activation signaling is sent to a UE for activating a first CC of the UE, wherein the MAC layer carrier activation signaling comprises CQI instruction information, for instructing the UE to report aperiodic CQI information of a second CC of the UE, the second CC comprising at least one of the first CC and CCs that have been activated before receiving the MAC layer carrier activation signaling by the UE;

the second CC may be one or more first CCs, or one or more CCs that have been activated before receiving the MAC layer carrier activation signaling by the UE, or one or more first CCs and one or more CCs that have been activated before receiving the MAC layer carrier activation signaling by the UE.

At step 102, the UE triggers to report aperiodic CQI information of the second CC of the UE upon receiving the MAC layer carrier activation signaling.

The CQI instruction information comprises CQI request information and resource block allocation information, or the CQI instruction information comprises the resource block allocation information; the CQI request information is used to indicate the second CC for which aperiodic CQI information reporting will be performed, the resource block allocation information is used to indicate resource blocks used to report aperiodic CQI information of the second CC.

The CQI instruction information may further comprise at least one of the following information:

code modulation information for indicating a code modulation manner that will be used in transmission;

PUSCH (Physical Uplink Share Channel) power control command information for specifying power adjustment of PUSCH;

frequency hopping flag for indicating whether to adopt frequency domain frequency hopping;

delay flag for indicating whether to delay aperiodic CQI information reporting by 1 subframe.

The above CQI instruction information may further comprise information indicating whether CQI measurement is based on CRS (Common reference signal) or CSI-RS (Channel state information reference signal).

With the method provided in the embodiment of this invention, CQI instruction information is included in the MAC layer carrier activation signaling sent to the UE, allowing to trigger aperiodic CQI information reporting of one or more CCs while activating the one or more CCs. Compared to the aperiodic CQI information reporting method in the prior art in which the reporting of CQI information of one or more CCs can only be triggered after the activation of the one or more CCs, and the CQI information of one or more CCs can only be reported after 12 subframes, a BS is enabled to rapidly acquire CQI information of one or more activated CCs of a UE, particularly, CQI information of one or more CCs that are just activated with the MAC layer carrier activation signaling, so that downlink channel status information of one or more activated CCs of the UE can be rapidly obtained, effectively improving downlink data channel performance of the UE on those one or more CCs. Meanwhile, as compared to the periodic CQI information reporting method in the prior art, the method provided in the embodiment of this invention comprises triggering to report aperiodic CQI information of one or more CCs while activating the one or more CCs, enabling a BS to rapidly acquire CQI information of the one or more activated CCs, while preventing serious limitations on BS scheduling, and avoiding a problem of significant uncertainty about the timing of acquiring valid CQI information due to potential retransmission of the MAC layer carrier activation signaling.

Figure 2:
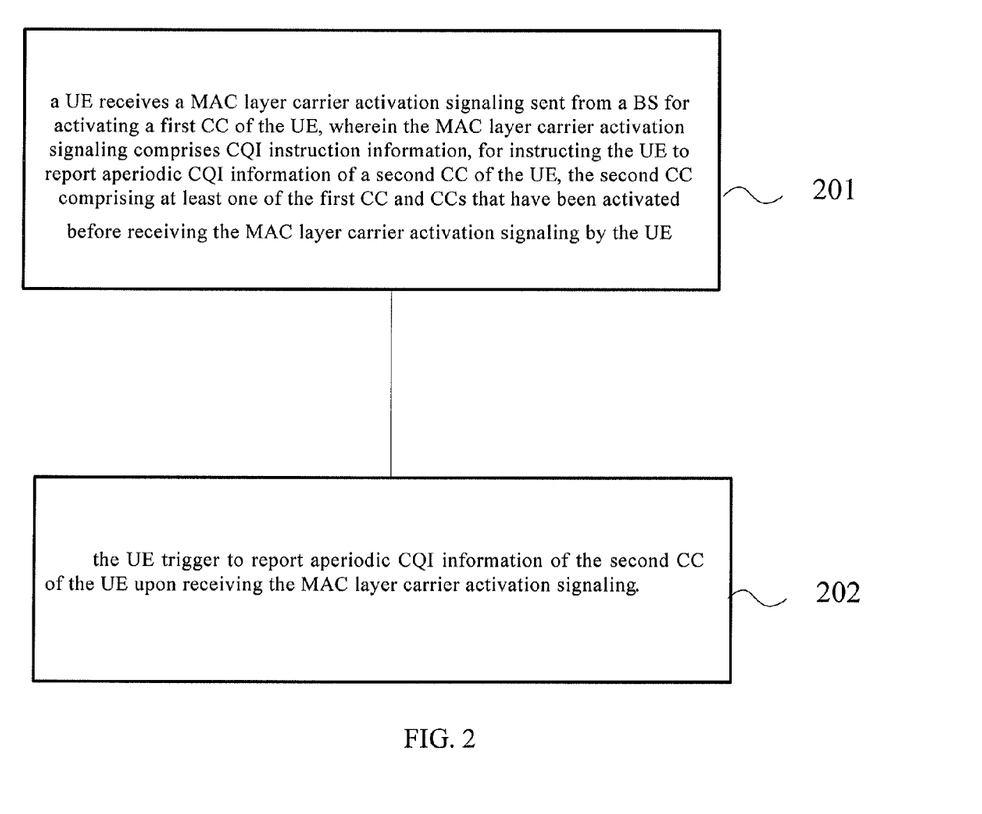
FIG. 2 is a flowchart of another information reporting method provided in an embodiment of this invention.

An information reporting method provided in an embodiment of this invention will be particularly described in connection with FIG. 2 below. As shown in FIG. 2, the method comprises the following steps.

At step 201, a UE receives a MAC (Medium Access Control) layer carrier activation signaling sent from a BS for activating a first CC of the UE, wherein the MAC layer carrier activation signaling comprises CQI instruction information, for instructing the UE to report aperiodic CQI information of a second CC of the UE, the second CC comprising at least one of the first CC and CCs that have been activated before receiving the MAC layer carrier activation signaling by the UE;

the second CC may be one or more first CC, or one or more CCs that have been activated before receiving the MAC layer carrier activation signaling by the UE, or one or more first CC and one or more CCs that have been activated before receiving the MAC layer carrier activation signaling by the UE.

The CQI instruction information comprises CQI request information and resource block allocation information, or the CQI instruction information comprises the resource block allocation information; the CQI request information is used to indicate the second CC for which aperiodic CQI information reporting will be performed, the resource block allocation information is used to indicate resource blocks used to report aperiodic CQI information of the second CC.

The above CQI instruction information may further comprise at least one of the following information:

code modulation information for indicating a code modulation manner that will be used in transmission;

PUSCH (Physical Uplink Share Channel) power control command information for specifying power adjustment of PUSCH;

frequency hopping flag for indicating whether to adopt frequency domain frequency hopping;

delay flag for indicating whether to delay aperiodic CQI information reporting by 1 subframe.

The above CQI instruction information may further comprise information indicating whether CQI measurement is based on CRS (Common reference signal) or CSI-RS (Channel state information reference signal).

The second CC may comprise the above first CC activated with the MAC layer carrier activation signaling, it may further comprise CCs that have been activated before the activation of the first CC with the MAC layer carrier activation signaling. The second CC described above may be a set including the above first CC activated with the MAC layer carrier activation signaling, or a set including CCs that have been activated before the activation of the first CC with the MAC layer carrier activation signaling, or the first CC activated with the MAC layer carrier activation signaling, or CCs that have been activated before the activation of the first CC with the MAC layer carrier activation signaling. The second CC may be one or more CCs.

Particularly, in an embodiment, if the CQI request information described above is of 1 bit, it can be used to trigger aperiodic CQI information reporting of all CCs that are activated with the above MAC layer carrier activation signaling; further it may be used to trigger aperiodic CQI information reporting of all activated CCs, wherein the CCs described above may comprise a main carrier; or it may represent aperiodic CQI information reporting of all activated CC except the main carrier.

The above CQI request information may be also more than 1bit. For example, the CQI request information may use 5 bits to represent whether every CC of the UE will trigger aperiodic CQI information reporting, respectively; for example, the CQI request information may use 4 bits to represent whether every CC except the main carrier of the UE will trigger aperiodic CQI information reporting, respectively.

At step 202, the UE trigger to report aperiodic CQI information of the second CC of the UE upon receiving the MAC layer carrier activation signaling.

Opportunities to report aperiodic CQI information of the second CC by the UE may comprise:

method 1: if the MAC layer carrier activation signaling is carried on a first subframe, carrying aperiodic CQI information of the second CC of the UE on the N-th subframe after the first subframe to report, N≥4+$n_{CQI\_ref}$, wherein N is an integer and $n_{CQI\_ref}$ is an integer value larger than or equal to 4; or method 2: if the MAC layer carrier activation signaling is carried on a first subframe, carrying aperiodic CQI information of the second CC of the UE on the N-th subframe after the first subframe to report, wherein N is an integer larger than 5.

Opportunities to report aperiodic CQI information of the second CC by the UE may further comprise:

method 3: if the MAC layer carrier activation signaling is carried on a first subframe, carrying aperiodic CQI information of the second CC of the UE on the $k_1$ subframe after the first subframe to report, $k_1 = \lceil k+t+n_{CQI\_ref} \rceil$, representing a rounding operation, wherein $n_{CQI ref}$ is an integer value larger than or equal to 4, t is a time required to open a RF channel of a CC activated with the above MAC layer carrier activation signaling, usually, about 0.5, k is a minimum integer value larger than or equal to 4.

When the above CQI request information is of 1 bit, and is used to indicate aperiodic CQI information reporting of a CC activated with the MAC layer carrier activation signaling, it can be performed according to method 1 or method 3; when the CQI request information is of 1 bit, and is used to indicate aperiodic CQI information reporting of all activated CCs, it can be performed according to method 1 or method 3; also, aperiodic CQI information of a CC activated with the MAC layer carrier activation signaling can be reported according to method 1 or method 3, and aperiodic CQI information of CCs that have been activated before receiving the MAC layer carrier activation signaling by the UE can be reported according to method 2.

When the above CQI request information is of 1 bit and is used to indicate aperiodic CQI information reporting of all activated CCs except the main carrier, it can be performed according to method 1 or method 3, also, aperiodic CQI information of a CC activated with the MAC layer carrier activation signaling can be reported according to method 1 or method 3, and aperiodic CQI information of activated CCs except the main CC before receiving the MAC layer carrier activation signaling by the UE can be reported according to method 2; when the CQI request information is more than 1 bit, such as 5 bits, and is used to indicate whether every CC will trigger aperiodic CQI information reporting, it can be performed according to method 1 or method 3, also, aperiodic CQI information reporting of a CC activated with the MAC layer carrier activation signaling can be performed according to method 1 or method 3, and aperiodic CQI information reporting of activated CCs before receiving the MAC layer carrier activation signaling by the UE can be performed according to method 2.

When the CQI request information is more than 1 bit, such as 4 bits, and is used to indicate whether aperiodic CQI information reporting will be triggered for every CC except the main carrier, it can be performed according to method 1 or method 3; also, aperiodic CQI information reporting of a CC activated by the MAC layer carrier activation signaling can be performed according to method 1 or method 3, and aperiodic CQI information reporting of CCs except the main carrier that have been activated before receiving the MAC layer carrier activation signaling by the UE can be performed according to method 2.

In this embodiment, the UE can carry the above aperiodic CQI information on an uplink carrier to report, and the reporting manner may comprise:

carrying aperiodic CQI information of the second CC of the UE on the main uplink carrier of the UE to report; or carrying aperiodic CQI information of the second CC of the UE on an uplink CC paired with a downlink CC carrying the MAC layer carrier activation signaling to report; or carrying aperiodic CQI information of the second CC of the UE on an uplink CC having a link to a downlink CC carrying the MAC layer carrier activation signaling to report.

The above reporting manner may also comprise carrying aperiodic CQI information of the second CC of the UE on an uplink CC paired with or having a link to a PDCCH downlink CC carrying the MAC layer carrier activation signaling to report.

In one embodiment, when aperiodic CQI information of the second CC of the UE that is reported by the UE is carried on a second subframe to transmit, the second subframe is simultaneously used to carry periodic CQI information of a third CC of the UE that is reported by the UE, and the third CC of the UE is a CC different from the second CC of the UE, aperiodic CQI information of the second CC and periodic CQI information of the third CC are sorted by a predefined sorting rule and be channel encoded, the channel-encoded information is then carried on the second subframe, and the second subframe comprising the channel-encoded information is reported.

Particularly, assume the second CC may be CC1 (Component carrier 1), the third CC may be CC2, sorting aperiodic CQI information of the second CC and periodic CQI information of the third CC according to a predefined sorting rule, and then performing channel encoding may comprise:

sorting aperiodic CQI information of CC1 and periodic CQI information of CC2 according to a predefined sorting rule, performing channel-encoding on the sorted information, such as channel encoding with convolutional code. The predefined sorting rule may be ascending or descending order of component carrier indexes or component carrier frequencies of CC1 and CC2.

With the method provided in the embodiment of this invention, CQI instruction information is included in the MAC layer carrier activation signaling sent to the UE, allowing to trigger aperiodic CQI information reporting of one or more CCs while activating the one or more CCs. Compared to the aperiodic CQI information reporting method in the prior art, a BS is enabled to rapidly acquire CQI information of one or more activated CCs of a UE, particularly, CQI information of one or more CCs that are just activated with the MAC layer carrier activation signaling, so that downlink channel status information of one or more activated CCs of the UE can be rapidly obtained, effectively improving downlink data channel performance of the UE on those one or more CCs. Meanwhile, as compared to the periodic CQI information reporting method in the prior art, the method provided in the embodiment of this invention enables a BS to rapidly acquire CQI information of one or more activated CCs, while preventing serious limitations on BS scheduling, and avoiding a problem of significant uncertainty about the timing of acquiring valid CQI information due to potential retransmission of the MAC layer carrier activation signaling.

Figure 3:
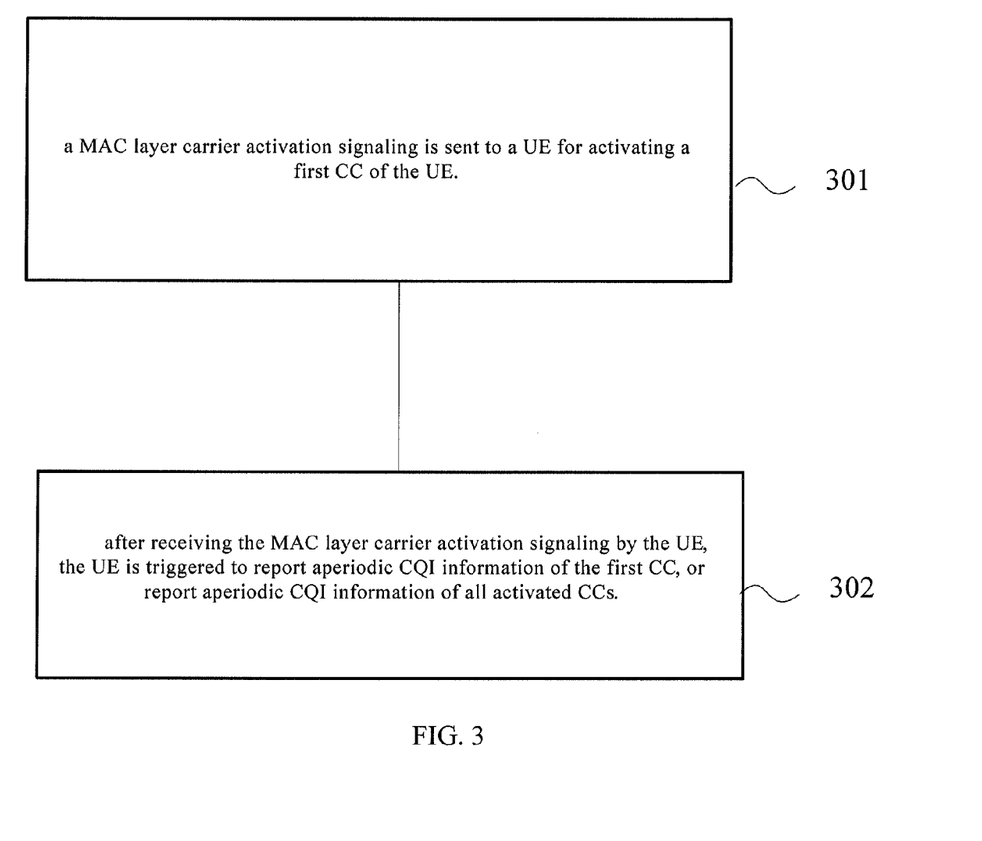
FIG. 3 is a flowchart of another information reporting method provided in an embodiment of this invention.

An information reporting method provided in an embodiment of this invention will be particularly described in connection with FIG. 3 below. As shown in FIG. 3, the method comprises the following steps.

At step 301, a MAC layer carrier activation signaling is sent to a UE for activating a first CC of the UE.

At step 302, after receiving the MAC layer carrier activation signaling, the UE is triggered to report aperiodic CQI information of the first CC, or report aperiodic CQI information of all activated CCs.

With the method provided in the embodiment of this invention, the MAC layer carrier activation signaling sent to the UE allows to trigger aperiodic CQI information reporting of one or more CCs, while the one or more CCs are activated. Compared to the aperiodic CQI information reporting method in the prior art, a BS is enabled to rapidly acquire CQI information of one or more activated CCs of a UE, particularly, CQI information of one or more CCs that are just activated with the MAC layer carrier activation signaling, so that downlink channel status information of one or more activated CCs of the UE can be rapidly obtained, enabling effective improvement of downlink data channel performance of the UE on those one or more CCs. Meanwhile, as compared to the periodic CQI information reporting method in the prior art, the method provided in the embodiment of this invention enables a BS to rapidly acquire CQI information of one or more activated CCs, while preventing serious limitations on BS scheduling, and avoiding a problem of significant uncertainty about the timing of acquiring valid CQI information due to potential retransmission of the MAC layer carrier activation signaling.

Figure 4:
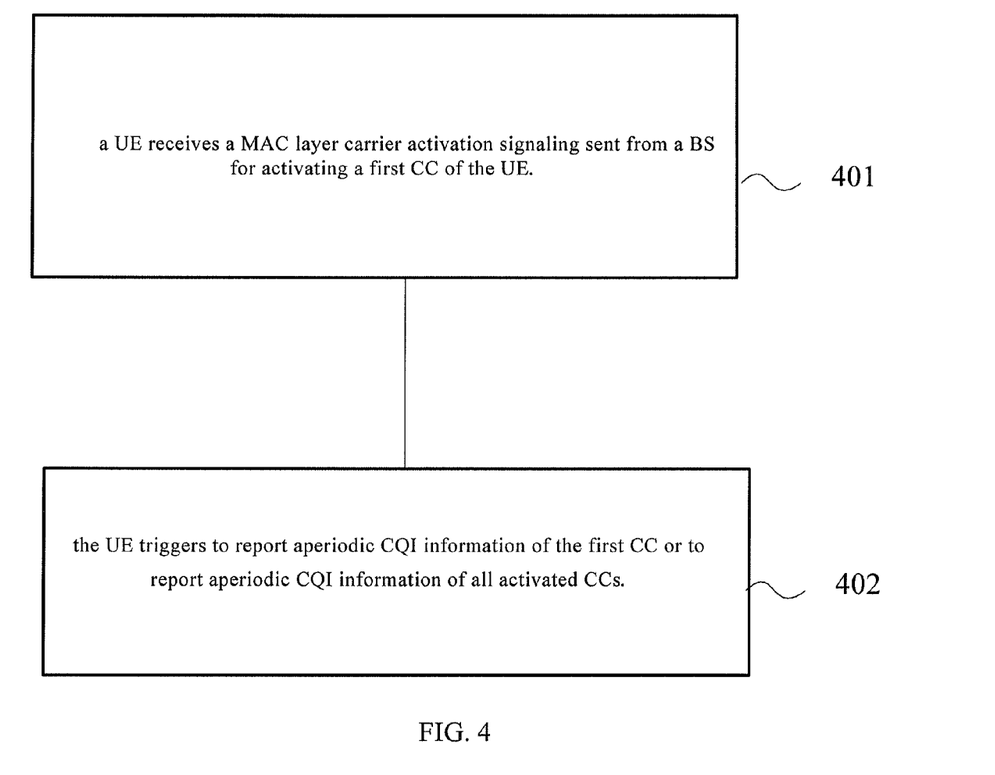
FIG. 4 is a flowchart of still another information reporting method provided in an embodiment of this invention.

An information reporting method provided in an embodiment of this invention will be particularly described in connection with FIG. 4 below. As shown in FIG. 4, the method comprises the following steps.

At step 401, a UE receives a MAC layer carrier activation signaling sent from a BS for activating a first CC of the UE.

At step 402, the UE triggers to report aperiodic CQI information of the first CC or to report aperiodic CQI information of all activated CCs.

When the UE triggers to report aperiodic CQI information of the first CC or aperiodic CQI information of all activated CCs, if the MAC layer carrier activation signaling is carried on a first subframe, the aperiodic CQI information of the first CC or the aperiodic CQI information of all activated CCs is carried on the N-th subframe after the first subframe to report, $N \geq 4+n_{CQI\_ref}$, wherein N is an integer and $n_{CQI\_ref}$ is an integer value larger than or equal to 4;

or when the UE triggers to report aperiodic CQI information of all activated CCs, if the MAC layer carrier activation signaling is carried on a first subframe, aperiodic CQI information of the first CC is carried on the N-th subframe after the first subframe to report, $N \geq 4+n_{CQI\_ref}$, wherein N is an integer and $n_{CQI\_ref}$ is an integer value larger than or equal to 4; aperiodic CQI information of activated CCs except the first CC is carried on the N-th subframe after the first subframe to report, wherein N is an positive integer larger than 5.

The UE can carry aperiodic CQI information of the first CC or aperiodic CQI information of all activated CCs on a main uplink carrier of the UE to report; or aperiodic CQI information of the first CC and aperiodic CQI information of all activated CCs can be carried on an uplink CC paired with a downlink CC carrying the MAC layer carrier activation signaling to report; or aperiodic CQI information of the first CC and aperiodic CQI information of all activated CCs can be carried on an uplink CC having a link to a downlink CC carrying the MAC layer carrier activation signaling to report.

The above reporting manner may also comprise carrying aperiodic CQI information of the first CC and aperiodic CQI information of all activated CCs on an uplink CC paired with or having a link to a PDCCH downlink CC carrying the MAC layer carrier activation signaling to report.

In one embodiment, when aperiodic CQI information of the first CC of the UE or aperiodic CQI information of all activated CCs are carried on a third subframe to transmit, and the third subframe is simultaneously used to carry periodic CQI information of a fourth CC of the UE that is reported by the UE, and the fourth CC differs from the first CC or any activated CC, aperiodic CQI information of the first CC and periodic CQI information of the fourth CC are sorted by a predefined sorting rule and then channel-encoded, or aperiodic CQI information of all activated CCs and periodic CQI information of the fourth CC are sorted by a predefined sorting rule and then channel-encoded, the channel-encoded information is then carried on the third subframe, and the third subframe comprising the channel-encoded information is reported to the BS.

With the method provided in the embodiment of this invention, the MAC layer carrier activation signaling sent to the UE allows to trigger aperiodic CQI information reporting of one or more CCs, while the one or more CCs are activated. Compared to the aperiodic CQI information reporting method in the prior art, a BS is enabled to rapidly acquire CQI information of one or more activated CCs of a UE, particularly, CQI information of one or more CCs that are just activated with the MAC layer carrier activation signaling, so that downlink channel status information of one or more activated CCs of the UE can be rapidly obtained, effectively improving downlink data channel performance of the UE on those one or more CCs. Meanwhile, as compared to the periodic CQI information reporting method in the prior art, the method provided in the embodiment of this invention enables a BS to rapidly acquire CQI information of one or more activated CCs, while preventing serious limitations on BS scheduling, and avoiding a problem of significant uncertainty about the timing of acquiring valid CQI information due to potential retransmission of the MAC layer carrier activation signaling.

Figure 5:
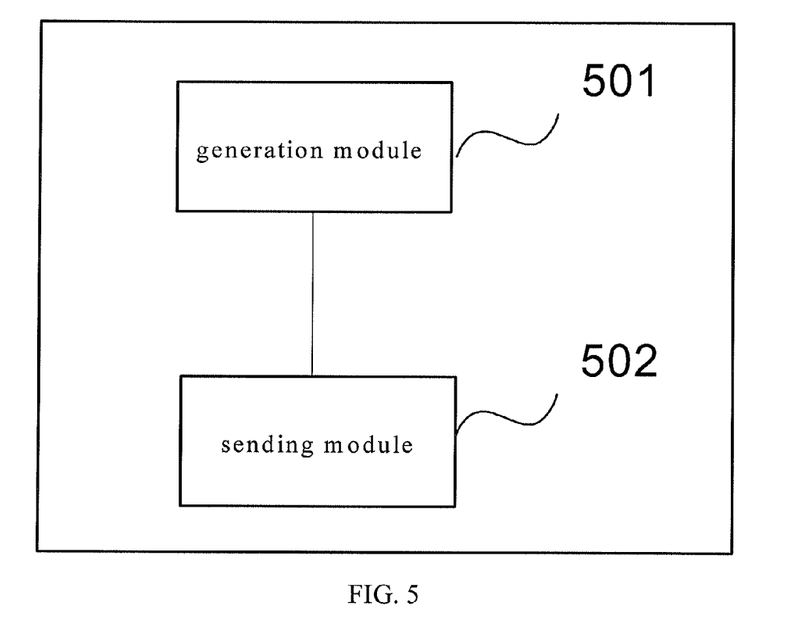
FIG. 5 is a schematic structure diagram of a base station provided in an embodiment of this invention.

A base station (BS) provided in an embodiment of this invention will be particularly described in connection with FIG. 5. As shown in FIG. 5, the BS comprises:

a generation module 501 for generating a MAC layer carrier activation signaling for activating a first CC of a UE, the MAC layer carrier activation signaling comprising CQI instruction information, for instructing the UE to report aperiodic CQI information of a second CC of the UE, the second CC comprising at least one of the first CC and CCs that have been activated before receiving the MAC layer carrier activation signaling by the UE, so that the UE triggers to report aperiodic CQI information of the second CC of the UE upon receiving the MAC layer carrier activation signaling;

The second CC may be one or more first CCs, or one or more CCs that have been activated before receiving the MAC layer carrier activation signaling by the UE, or one or more first CCs and one or more CCs that have been activated before receiving the MAC layer carrier activation signaling by the UE.

The CQI instruction information comprises CQI request information and resource block allocation information, or the CQI instruction information comprises the resource block allocation information; the CQI request information is used to indicate the second CC for which aperiodic CQI information reporting will be performed, the resource block allocation information is used to indicate resource blocks used to report aperiodic CQI information of the second CC.

a sending module 502 for sending the MAC layer carrier activation signaling generated by the generation module 501 to the UE;

With the method provided in the embodiment of this invention, CQI instruction information is included in the MAC layer carrier activation signaling sent to the UE, allowing to trigger aperiodic CQI information reporting of one or more CCs while activating the one or more CCs. Compared to the aperiodic CQI information reporting method in the prior art, a BS is enabled to rapidly acquire CQI information of one or more activated CCs of a UE, particularly, CQI information of one or more CCs that are just activated with the MAC layer carrier activation signaling, so that downlink channel status information of one or more activated CCs of the UE can be rapidly obtained, effectively improving downlink data channel performance of the UE on those one or more CCs. Meanwhile, as compared to the periodic CQI information reporting method in the prior art, the method provided in the embodiment of this invention enables a BS to rapidly acquire CQI information of one or more activated CCs, while preventing serious limitations on BS scheduling, and avoiding a problem of significant uncertainty about the timing of acquiring valid CQI information due to potential retransmission of the MAC layer carrier activation signaling.

Figure 6:
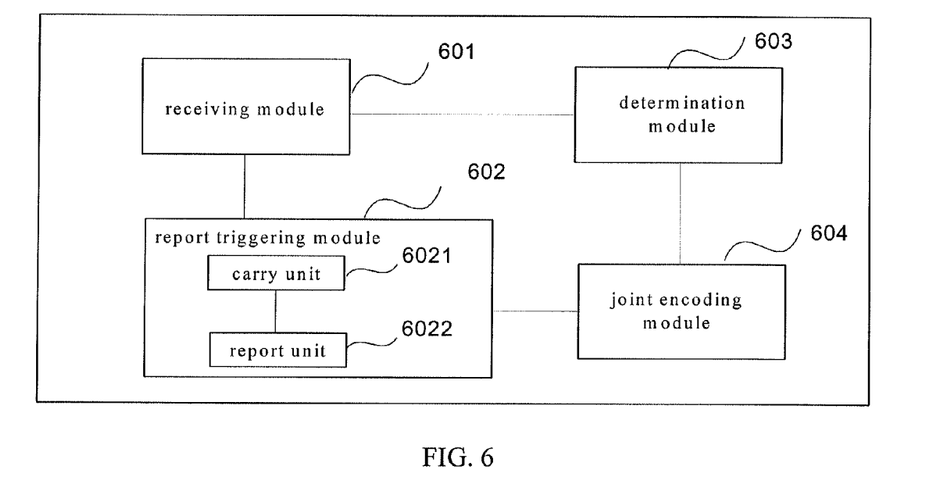
FIG. 6 is a schematic structure diagram of user equipment provided in an embodiment of this invention.

Below, a UE provided in an embodiment of this invention will be described in detail with reference to FIG. 6. As shown in FIG. 6, the UE comprises:

a receiving module 601 for receiving a MAC layer carrier activation signaling for activating a first CC of the UE sent from a BS, the MAC layer carrier activation signaling comprising CQI instruction information, for instructing the UE to report aperiodic CQI information of a second CC of the UE, the second CC comprising at least one of the first CC and CCs that have been activated before receiving the MAC layer carrier activation signaling by the UE;

The second CC may be one or more first CCs, or one or more CCs that have been activated before receiving the MAC layer carrier activation signaling by the UE, or one or more first CCs and one or more CCs that have been activated before receiving the MAC layer carrier activation signaling by the UE.

The CQI instruction information comprises CQI request information and resource block allocation information, or the CQI instruction information comprises the resource block allocation information; the CQI request information is used to indicate the second CC for which aperiodic CQI information reporting will be performed, the resource block allocation information is used to indicate resource blocks to report aperiodic CQI information of the second CC.

Particularly, in an embodiment, if the CQI request information is of 1 bit, it can be used to trigger aperiodic CQI information reporting of all CCs activated with the MAC layer carrier activation signaling; it also can be used to trigger aperiodic CQI information reporting of all activated CCs, including a main carrier; it also can be used to trigger aperiodic CQI information reporting of all activated CCs except the main carrier.

The CQI request information may be also more than 1 bit. For example, the CQI request information may use 5 bits to represent whether every CC of the UE will trigger aperiodic CQI information reporting, respectively; for example, the CQI request information may use 4 bits to represent whether every CC except the main carrier of the UE will trigger aperiodic CQI information reporting, respectively.

a report triggering module 602 for triggering to report aperiodic CQI information of the second CC of the UE upon receiving the MAC layer carrier activation signaling by the receiving module 601.

The report triggering module 602 comprises a carry unit 6021 and a report unit 6022.

The receiving module 601 is particularly used to receive the MAC layer carrier activation signaling through a first subframe.

The carry unit 6021 is used to, when the second CC is at least one of the first CC and CCs that have been activated before receiving the MAC layer carrier activation signaling by the UE, after receiving the first subframe by the receiving module, carry CQI information of the second CC of the UE on the N-th subframe after the first subframe, $N \geq 4+n_{CQI\_ref}$, wherein N is an integer and $n_{CQI\_ref}$ is an integer value larger than or equal to 4; or when the second CC is a CC that has been activated before receiving the MAC layer carrier activation signaling by the UE, if the MAC layer carrier activation signaling is carried on the first subframe, carry aperiodic CQI information of the second CC of the UE on the N-th subframe after the first subframe to report, wherein N is an integer larger than 5.

The carry unit 6021 may be also used to, when the second CC is at least one of the first CC and CCs that have been activated before receiving the MAC layer carrier activation signaling by the UE, if the MAC layer carrier activation signaling is carried on the first subframe, carry aperiodic CQI information of the second CC of the UE on the $k_1$ subframe after the first subframe to report, $k_1 = \lceil k+t+n_{CQI\_ref} \rceil$, which represents a rounding operation, wherein $n_{CQI\_ref}$ is an integer value larger than or equal to 4, t is a time required to enable a RF channel of a CC activated with the above MAC layer carrier activation signaling, usually, about 0.5, k is a minimum integer value larger than or equal to 4.

The report unit 6022 is used to, after carrying CQI information of the second CC of the UE on the N-th subframe after the first subframe by the carry unit 6021, report the aperiodic CQI information through the N-th subframe after the first subframe.

The report triggering module 602 is particularly used to, after receiving the MAC layer carrier activation signaling by the receiving module 601, carry the CQI information on a main uplink carrier of the UE, and trigger the report of aperiodic CQI information of the second CC of the UE through the main uplink carrier;

or the report triggering module 602 is particularly used to, after receiving the MAC layer carrier activation signaling by the receiving module 601, carry the CQI information on an uplink carrier having a link to a downlink CC on which the MAC layer carrier activation signaling is carried, and trigger the report of aperiodic CQI information of the second CC of the UE through the uplink CC;

or the report triggering module 602 is particularly used to, after receiving the MAC layer carrier activation signaling by the receiving module 601, carry the CQI information on an uplink paired with a downlink CC on which the MAC layer carrier activation signaling is carried, and trigger the report of aperiodic CQI information of the second CC of the UE through the uplink CC.

The report triggering module 602 may further particularly used to, after receiving the MAC layer carrier activation signaling by the receiving module 601, carry the CQI information on an uplink CC having a link or paired with a PDCCH downlink CC on which the MAC layer carrier activation signaling is carried, and trigger the reporting of aperiodic CQI information of the second CC of the UE through the uplink CC.

The UE may further comprise a determination module 603 and a joint encoding module 604.

The determination module 603 is used to, after receiving the MAC layer carrier activation signaling by the receiving module 601, when aperiodic CQI information of a second CC of the UE reported by the UE is carried on a second subframe to transmit, determine whether the second subframe is simultaneously used to carry periodic CQI information of a third CC of the UE, the third CC being a CC different from the second CC.

The joint encoding module 604 is used to, after the determination module 603 has determined that when aperiodic CQI information of the second CC of the UE reported by the UE is carried on a second subframe to transmit, the second subframe is simultaneously used to carry periodic CQI information of a third CC of the UE, the third CC being a CC different from the second CC, sort the aperiodic CQI information of the second CC and the periodic CQI information of the third CC according to a predefined sorting rule and then perform channel-encoding, the channel-encoded information being carried on the second subframe.

The report triggering module 602 is particularly used to report the second subframe including the channel-encoded information obtained by the joint encoding module 604.

Particularly, assume that the second CC may be CC1 (component carrier 1), the third CC may be CC2, sorting aperiodic CQI information of the second CC and periodic CQI information of the third CC according to a predefined sorting rule and then performing channel encoding may comprise:

sorting aperiodic CQI information of CC1 and periodic CQI information of CC2 according to a predefined sorting rule, performing channel-encoding on the sorted information, such as channel encoding with convolutional code. The predefined sorting rule may be ascending or descending order of component carrier indexes or component carrier frequencies of CC1 and CC2.

With the method provided in the embodiment of this invention, CQI instruction information is included in the MAC layer carrier activation signaling sent to the UE, allowing to trigger aperiodic CQI information reporting of one or more CCs while activating the one or more CCs. Compared to the aperiodic CQI information reporting method in the prior art, a BS is enabled to rapidly acquire CQI information of one or more activated CCs of a UE, particularly, CQI information of one or more CCs that are just activated with the MAC layer carrier activation signaling, so that downlink channel status information of one or more activated CCs of the UE can be rapidly obtained, effectively improving downlink data channel performance of the UE on those one or more CCs. Meanwhile, as compared to the periodic CQI information reporting method in the prior art, the method provided in the embodiment of this invention enables a BS to rapidly acquire CQI information of one or more activated CCs, while preventing serious limitations on BS scheduling, and avoiding a problem of significant uncertainty about the timing of acquiring valid CQI information due to potential retransmission of the MAC layer carrier activation signaling.

Figure 7:
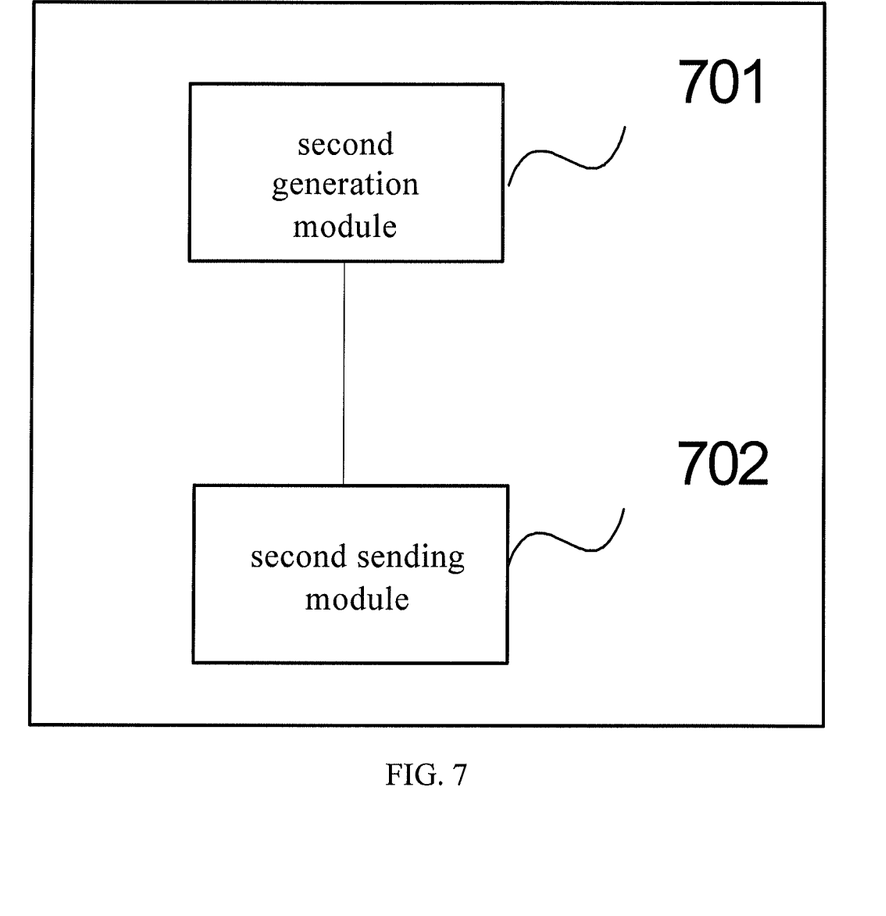
FIG. 7 is a schematic structure diagram of another base station provided in an embodiment of this invention.

Below, a base station (BS) provided in an embodiment of this invention will be particularly described in connection with FIG. 7. As shown in FIG. 7, the base station comprises:

a second generation module 701 for generating a MAC layer carrier activation signaling for activating a first CC of a UE, the MAC layer carrier activation signaling being used for triggering the UE to report aperiodic CQI information of the first CC, or to report aperiodic CQI information of all activated CCs;

a second sending module 702 for sending the MAC layer carrier activation signaling generated by the second generation module 702 to the UE.

With the method provided in the embodiment of this invention, CQI instruction information is included in the MAC layer carrier activation signaling sent to the UE, allowing to trigger aperiodic CQI information reporting of one or more CCs while activating the one or more CCs. Compared to the aperiodic CQI information reporting method in the prior art, a BS is enabled to rapidly acquire CQI information of one or more activated CCs of a UE, particularly, CQI information of one or more CCs that are just activated with the MAC layer carrier activation signaling, so that downlink channel status information of one or more activated CCs of the UE can be rapidly obtained, effectively improving downlink data channel performance of the UE on those one or more CCs. Meanwhile, as compared to the periodic CQI information reporting method in the prior art, the method provided in the embodiment of this invention enables a BS to rapidly acquire CQI information of one or more activated CCs, while preventing serious limitations on BS scheduling, and avoiding a problem of significant uncertainty about the timing of acquiring valid CQI information due to potential retransmission of the MAC layer carrier activation signaling.

Figure 8:
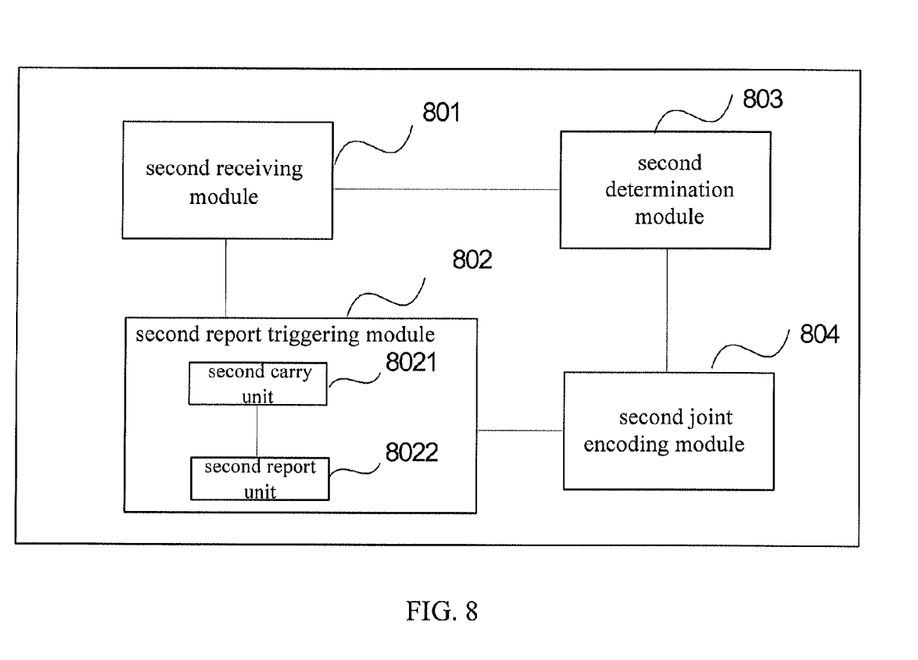
FIG. 8 is a schematic structure diagram of another user equipment provided in an embodiment of this invention.

Below, a user equipment (UE) provided in an embodiment of this invention will be particularly described in connection with FIG. 8. As shown in FIG. 8, the UE comprises:

a second receiving module 801 for receiving a MAC layer carrier activation signaling sent from a BS for activating a first CC of the UE, a second triggering module 802 for triggering to report aperiodic CQI information of the first CC, or aperiodic CQI information reporting of all activated CCs upon receiving the MAC layer carrier activation signaling by the second receiving module 801.

The second report triggering module 802 comprises a second carry unit 8021 and a second report unit 8022.

The second receiving module 801 is particularly used to receive the MAC layer carrier activation signaling through a first subframe.

The second carry unit 8021 is used to, when the UE triggers the reporting of aperiodic CQI information of the first CC or aperiodic CQI information of all activated CCs, if the MAC layer carrier activation signaling is carried on the first subframe, carry aperiodic CQI information of the first CC or aperiodic CQI information of all activated CCs on the N-th subframe after the first subframe, N≥4+$n_{CQI\_ref}$, wherein N is an integer and $n_{CQI\_ref}$ is an integer value larger than or equal to 4; or when the UE triggers the report of aperiodic CQI information of all activated CCs, if the MAC layer carrier activation signaling is carried on the first subframe, carry aperiodic CQI information of the first CC on the N-th subframe after the first subframe to report, N≥4+$n_{CQI\_ref}$, wherein N is an integer and $n_{CQI\_ref}$ is an integer value larger than or equal to 4, and carry aperiodic CQI information of other activated CCs except the first CC on the N-th subframe after the first subframe to report, wherein N is an integer larger than 5.

The second carry unit 8021 may be also used to, when the UE triggers the report of aperiodic CQI information of the first CC or aperiodic CQI information of all activated CCs, if the MAC layer carrier activation signaling is carried on the first subframe, carry aperiodic CQI information of the second CC of the UE on the $k_1$-th subframe after the first subframe to report, $k_1=\lceil k+t+n_{CQI\_ref}\rceil$, representing a rounding operation, wherein $n_{CQI\_ref}$ is an integer value larger than or equal to 4, t is a time required to open a RF channel of a CC activated with the above MAC layer carrier activation signaling, usually, about 0.5, k is a minimum integer value larger than or equal to 4; aperiodic CQI information of the first CC or aperiodic CQI information of activated CCs can be reported at such an opportunity.

The second report unit 8022 is used to, after carrying aperiodic CQI information of the first CC on the N-th subframe after the first subframe or carrying aperiodic CQI information of all activated CCs on the N-th subframe after the first subframe by the carry unit, report aperiodic CQI information of the first CC or aperiodic CQI information of all activated CCs through the N-th subframe after the first subframe.

The second report triggering module 802 is particularly used to, after receiving the MAC layer carrier activation signaling by the second receiving module 801, carry aperiodic CQI information of the first CC or aperiodic CQI information of all activated CCs on a main uplink carrier of the UE to report;

or the second report triggering module 802 is particularly used to, after receiving the MAC layer carrier activation signaling by the second receiving module 801, carry aperiodic CQI information of the first CC or aperiodic CQI information of all activated CCs on an uplink carrier paired with a downlink CC on which the MAC layer carrier activation signaling is carried to report;

or the second report triggering module 802 is particularly used to, after receiving the MAC layer carrier activation signaling by the second receiving module 801, carry aperiodic CQI information of the first CC or aperiodic CQI information of all activated CCs on an uplink carrier having a link to a downlink CC on which the MAC layer carrier activation signaling is carried to report.

The UE may further comprise a second determination module 803 and a second joint encoding module 804.

The second determination module 803 is used to, after receiving the MAC layer carrier activation signaling by the second receiving module 801, when aperiodic CQI information of the first CC or aperiodic CQI information of all activated CCs are carried on the third subframe to transmit, determine whether the third subframe is simultaneously used to carry periodic CQI information of the fourth CC of the UE reported by the UE, the fourth CC being a CC different from the first CC or any activated CC.

The second joint encoding module 804 is used to, after the second determination module 803 has determined that, when aperiodic CQI information of the first CC or aperiodic CQI information of all activated CCs are carried on the third subframe to transmit, the third subframe is simultaneously used to carry periodic CQI information of the fourth CC of the UE reported by the UE, the fourth CC being a CC different from the first CC or any activated CC, sort the aperiodic CQI information of the first CC and the periodic CQI information of the fourth CC according to a predefined sorting rule and then perform channel-encoding, or sort the aperiodic CQI information of all activated CC and the periodic CQI information of the fourth CC according to a predefined sorting rule and then perform channel-encoding, the channel-encoded information being carried on the third subframe.

The second report triggering module 802 is particularly used to report the third subframe in which the channel-encoded information is included.

Particularly, assume that the first CC or activated CCs may be CC1 (component carrier 1), the fourth CC may be CC2, sorting aperiodic CQI information of the first CC and periodic CQI information of the fourth CC according to a predefined sorting rule and then performing channel encoding may comprise:

sorting aperiodic CQI information of CC1 and periodic CQI information of CC2 according to a predefined sorting rule, performing channel-encoding on the sorted information, such as channel encoding with convolutional code. The predefined sorting rule may be ascending or descending order of component carrier indexes or component carrier frequencies of CC1 and CC2.

With the method provided in the embodiment of this invention, CQI instruction information is included in the MAC layer carrier activation signaling sent to the UE, allowing to trigger aperiodic CQI information reporting of one or more CCs while activating the one or more CCs. Compared to the aperiodic CQI information reporting method in the prior art, a BS is enabled to rapidly acquire CQI information of one or more activated CCs of a UE, particularly, CQI information of one or more CCs that are just activated with the MAC layer carrier activation signaling, so that downlink channel status information of one or more activated CCs of the UE can be rapidly obtained, effectively improving downlink data channel performance of the UE on those one or more CCs. Meanwhile, as compared to the periodic CQI information reporting method in the prior art, the method provided in the embodiment of this invention enables a BS to rapidly acquire CQI information of one or more activated CCs, while preventing serious limitations on BS scheduling, and avoiding a problem of significant uncertainty about the timing of acquiring valid CQI information due to potential retransmission of the MAC layer carrier activation signaling.

Those skilled in the art may appreciate that all or partial steps of the method of the above embodiments can be implemented in program instruction related hardware. The programs can be stored in a computer readable medium. When the program is executed, the steps comprising the above methods are performed. The storage medium includes various mediums that can store program code, such as, ROM/RAM, magnetic disks, compact disks, and so on.

Finally, it should be noted that the above embodiments are merely used to illustrate technical solutions of this invention, but not as limitations. Although this invention has been described with reference to the above embodiments, those skilled in the art may understand that modifications may be made to various embodiments described above, or alternatives can be made to some of their technique features, without departing from the spirit and scope of technical solutions of various embodiments of this invention

What is claimed is:

1. An information reporting method, comprising:

generating a MAC (Medium Access Control) layer carrier activation signaling for activating a first CC (Component Carrier) of a UE (User Equipment);

sending the MAC layer carrier activation signaling to the UE, the MAC layer carrier activation signaling comprising CQI (Channel Quality Indication) instruction information, for instructing the UE to report aperiodic CQI information of a second CC of the UE, the second CC comprising at least one of CCs that have been activated before receiving the MAC layer carrier activation signaling by the UE and the first CC, so that the UE triggers to report aperiodic CQI information of the second CC of the UE while activating the first CC upon receiving the MAC layer carrier activation signaling.

2. The method according to claim 1, wherein:

the CQI instruction information comprises CQI request information and resource block allocation information, or the CQI instruction information comprises the resource block allocation information, wherein the CQI request information is used to indicate the second CC for which aperiodic CQI information reporting is performed, the resource block allocation information is used to indicate resource blocks that are used to report aperiodic CQI information of the second CC.

3. An information reporting method, comprising:

receiving by a UE a MAC layer carrier activation signaling for activating a first CC of the UE sent from a BS (Base Station), the MAC layer carrier activation signaling comprising CQI instruction information, for instructing the UE to report aperiodic CQI information of a second CC of the UE, the second CC comprising at least one of CCs that have been activated before receiving the MAC layer carrier activation signaling by the UE and the first CC;

triggering to report aperiodic CQI information of the second CC of the UE while activating the first CC upon receiving the MAC layer carrier activation signaling by the UE.

4. The method according to claim 3, wherein:

the CQI instruction information comprises CQI request information and resource block allocation information, or the CQI instruction information comprises the resource block allocation information, wherein the CQI request information is used to indicate the second CC for which aperiodic CQI information reporting is performed, and the resource block allocation information is used to indicate resource blocks that are used to report aperiodic CQI information of the second CC.

5. The method according to claim 3, wherein the triggering to report aperiodic CQI information of the second CC of the UE comprises:

when the second CC is at least one of CCs that have been activated before receiving the MAC layer carrier activation signaling by the UE and the first CC, if the MAC layer carrier activation signaling is carried on a first subframe, carrying aperiodic CQI information of the second CC of the UE on the N-th subframe after the first subframe to report, $N \geq 4 + n_{CQI\_ref}$, wherein N is an integer and $n_{CQI\_ref}$ is an integer value larger than or equal to 4; or when the second CC is CCs that have been activated before receiving the MAC layer carrier activation signaling by the UE, if the MAC layer carrier activation signaling is carried on the first subframe, carrying aperiodic CQI information of the second CC of the UE on the N-th subframe after the first subframe to report, wherein N is an integer larger than 5.

6. The method according to claim 3, wherein the triggering to report aperiodic CQI information of the second CC of the UE, comprises:

carrying aperiodic CQI information of the second CC of the UE on a main uplink carrier of the UE to report; or carrying aperiodic CQI information of the second CC of the UE on an uplink CC paired with a downlink CC carrying the MAC layer carrier activation signaling to report; or carrying aperiodic CQI information of the second CC of the UE on an uplink CC having a link to a downlink CC carrying the MAC layer carrier activation signaling to report.

7. The method according to claim 3, further comprises:
when aperiodic CQI information of the second CC of the UE that is reported by the UE is carried on a second subframe to transmit, and the second subframe is simultaneously used to carry periodic CQI information of a third CC of the UE that is reported by the UE, and the third CC is a CC different from the second CC, sorting aperiodic CQI information of the second CC and periodic CQI information of the third CC by a predefined sorting rule and then performing channel encoding, carrying the channel-encoded information on the second subframe;
triggering to report aperiodic CQI information of the second CC of the UE comprises:
reporting the second subframe in which the channel-encoded information is included.

8. A base station (BS), comprising at least a program instruction related hardware executing program codes stored in a non-transitory computer readable medium to cause the base station to:
generate a MAC layer carrier activation signaling for activating a first CC of a UE, the MAC layer carrier activation signaling comprising CQI instruction information, for instructing the UE to report aperiodic CQI information of a second CC of the UE, the second CC comprising at least one of CCs that have been activated before receiving the MAC layer carrier activation signaling by the UE and the first CC, so that the UE triggers to report aperiodic CQI information of the second CC of the UE while activating the first CC upon receiving the MAC layer carrier activation signaling;
send the MAC layer carrier activation signaling to the UE.

9. A user equipment (UE), comprising at least a program instruction related hardware executing program codes stored in a non-transitory computer readable medium to cause the UE to:
receive a MAC layer carrier activation signaling for activating a first CC of the UE sent from a BS, the MAC layer carrier activation signaling comprising CQI instruction information, for instructing the UE to report aperiodic CQI information of a second CC of the UE, the second CC comprising at least one of CCs that have been activated before receiving the MAC layer carrier activation signaling by the UE and the first CC;
trigger to report aperiodic CQI information of the second CC of the UE while activating the first CC upon receiving the MAC layer carrier activation signaling.

10. The UE according to claim 9, wherein the executed program codes cause the UE to:
receive the MAC layer carrier activation signaling through a first subframe;
when the second CC is at least one of the first CC and CCs that have been activated before receiving the MAC layer carrier activation signaling by the UE, after the first subframe has been received, carry CQI information of the second CC of the UE on the N-th subframe after the first subframe, $N \geq 4+n_{CQI\_ref}$, wherein N is an integer and $n_{CQI\_ref}$ is an integer value larger than or equal to 4;
or
when the second CC is CCs that have been activated before receiving the MAC layer carrier activation signaling by the UE, if the MAC layer carrier activation signaling is carried on the first subframe, carry aperiodic CQI information of the second CC of the UE on the N-th subframe after the first subframe to report, wherein N is an integer larger than 5;
after the carry unit carries CQI information of the second CC of the UE on the N-th subframe after the first subframe, report the aperiodic CQI information through the N-th subframe after the first subframe.

11. The UE according to claim 9, wherein the executed program codes cause the UE to:
after receiving the MAC layer carrier activation signaling, carry the CQI information on a main uplink carrier of the UE, and trigger the report of aperiodic CQI information of the second CC of the UE through the main uplink carrier;
or
after receiving the MAC layer carrier activation signaling, carry the CQI information on an uplink carrier having a link to a downlink CC on which the MAC layer carrier activation signaling is carried, and trigger the report of aperiodic CQI information of the second CC of the UE through the uplink CC;
or
after receiving the MAC layer carrier activation signaling, carry the CQI information on an uplink paired with a downlink CC on which the MAC layer carrier activation signaling is carried, and trigger the report of aperiodic CQI information of the second CC of the UE through the uplink CC.

12. The UE according to claim 9, wherein the executed program codes cause the UE to:
after the MAC layer carrier activation signaling has been received, when aperiodic CQI information of a second CC of the UE reported by the UE is carried on a second subframe to transmit, determine whether the second subframe is simultaneously used to carry periodic CQI information of a third CC of the UE, the third CC bring a CC different from the second CC;
having determined that, when aperiodic CQI information of the second CC of the UE reported by the UE is carried on a second subframe to transmit, the second subframe is simultaneously used to carry periodic CQI information of a third CC of the UE, the third CC being a CC different from the second CC, sort the aperiodic CQI information of the second CC and the periodic CQI information of the third CC according to a predefined sorting rule and then perform channel-encoding, and the channel-encoded information being carried on the second subframe;
report the second subframe including the channel-encoded information.

* * * * *